United States Patent
Wang et al.

(10) Patent No.: US 9,385,998 B2
(45) Date of Patent: Jul. 5, 2016

(54) SIGNALING AND CARRIAGE OF PROTECTION AND USAGE INFORMATION FOR DYNAMIC ADAPTIVE STREAMING

(71) Applicant: Futurewei Technologies, Inc., Plano, TX (US)

(72) Inventors: Xin Wang, Rancho Palos Verdes, CA (US); Yongliang Liu, Beijing (CN); Shaobo Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 117 days.

(21) Appl. No.: 14/298,721

(22) Filed: Jun. 6, 2014

(65) Prior Publication Data
US 2014/0365759 A1      Dec. 11, 2014

Related U.S. Application Data

(60) Provisional application No. 61/832,007, filed on Jun. 6, 2013.

(51) Int. Cl.
*H04L 29/06* (2006.01)
*H04L 29/08* (2006.01)

(52) U.S. Cl.
CPC ............ *H04L 63/0428* (2013.01); *H04L 67/02* (2013.01)

(58) Field of Classification Search
CPC .................................................. H04L 63/0428
USPC ........................................................ 713/151
See application file for complete search history.

(56) References Cited

U.S. PATENT DOCUMENTS

2012/0331293 A1* 12/2012  Ma et al. ....................... 713/168

OTHER PUBLICATIONS

Information technology—Dynamic adaptive streaming over HTTP (DASH)—Part 1: Media presentation description segment formats, 2012.*
Dolan, M., et al., "Sample Variants and Signatures for the ISOBMFF," International Organisation for Standardisation, ISO/IEC JTC1/SC29/WG11 MPEG2014/N14326, Valencia, Spain, Apr. 2014, 17 pages.
"Information Technology—Dynamic Adaptive Streaming Over HTTP (DASH)—Part 4: Segment Encryption and Authentication" International Standard, ISO/IEC 23009-4, First Edition, Jul. 1, 2013, 32 pages.

(Continued)

*Primary Examiner* — Jacob Lipman
(74) *Attorney, Agent, or Firm* — Conley Rose, P.C.; Grant Rodolph; Jonathan K. Polk

(57) ABSTRACT

A Dynamic Adaptive Streaming over Hypertext Transport Protocol (DASH) server component is disclosed. The DASH server component may comprise a memory, a processor coupled to the memory, and a transmitter coupled to the processor. The processor may be configured to generate one or more keys containing content protection information for media content, associate the keys with one or more segments of media content, store the keys in a DASH metadata track in the memory, and generate a media presentation description (MPD) specifying an association between the keys and the segments of media content. The transmitter may be configured to transmit the keys to at least one client independently of transmitting the media content and transmit the MPD to the at least one client.

23 Claims, 6 Drawing Sheets

(56) References Cited

OTHER PUBLICATIONS

"Information Technology—Dynamic Adaptive Streaming over HTTP (DASH)—Part 1: Media Presentation Description and Segments Formats / Amd 2," ISO/IEC JTC 1/SC 29 N14443, ISO/IEC 23009-1:201x/PDAM 2, Apr. 11, 2014, 17 pages.

"Information Technology—MPEG Systems Technologies—Part 7: Common Encryption in ISO Base Media File Format Files," ISO/IEC JTC 1/SC 29 N, Study of ISO/IEC CD 23001-7, 2nd Edition, N13971, Apr. 4, 2013, 22 pages.

"Information Technology—MPEG Systems Technologies—Part 10: Carriage of Timed Metadata Metrics of Media in ISO Base Media File Format," ISO/IEC JTC 1/SC29N, ISO/IEC CD 23001-10, Jan. 17, 2014, 24 pages.

* cited by examiner

SIGNALING AND CARRIAGE OF PROTECTION AND USAGE INFORMATION FOR DYNAMIC ADAPTIVE STREAMING

CROSS-REFERENCE TO RELATED APPLICATIONS

The present application claims priority to U.S. Provisional Patent Application 61/832,007, filed Jun. 6, 2013 by Xin Wang et al., and entitled "Method and System for Signaling and Carriage of Protection and Usage Information for Dynamic Adaptive Streaming," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers or users using different encryption and/or coding schemes suited for different devices, such as televisions, notebook computers, mobile handsets, etc. The media content provider may support a plurality of media encoders and/or decoders (codecs), media players, video frame rates, spatial resolutions, bit rates, video formats, or combinations thereof. A piece of media content may be converted from a source or original representation to various other representations to suit the different user devices.

SUMMARY

In one embodiment, the disclosure includes a Dynamic Adaptive Streaming over Hypertext Transport Protocol (DASH) server component. The DASH server component comprises a memory, a processor coupled to the memory, and a transmitter coupled to the processor. The processor is configured to generate content protection information containing content one or more keys for media content, associate the content protection information with one or more segments of media content, store the content protection information in a DASH metadata track in the memory, and generate a media presentation description (MPD) specifying an association between the content protection information and the segments of media content. The transmitter is configured to transmit the content protection information to at least one client independently of transmitting the media content and transmit the MPD to the at least one client.

In another embodiment, the disclosure includes a method for transmitting content protection information for a DASH transmission. The method comprises generating, by a DASH server component, content protection information containing a key for media content; associating the content protection information with at least one segment of media content; storing the content protection information as a segment in a DASH metadata track; and transmitting the metadata track to a client independently of transmitting the media content.

In another embodiment, the disclosure includes a DASH client. The DASH client comprises a memory and a processor coupled to the memory. The processor is configured such that the DASH client receives content protection information for media content in a metadata representation of a DASH transmission.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
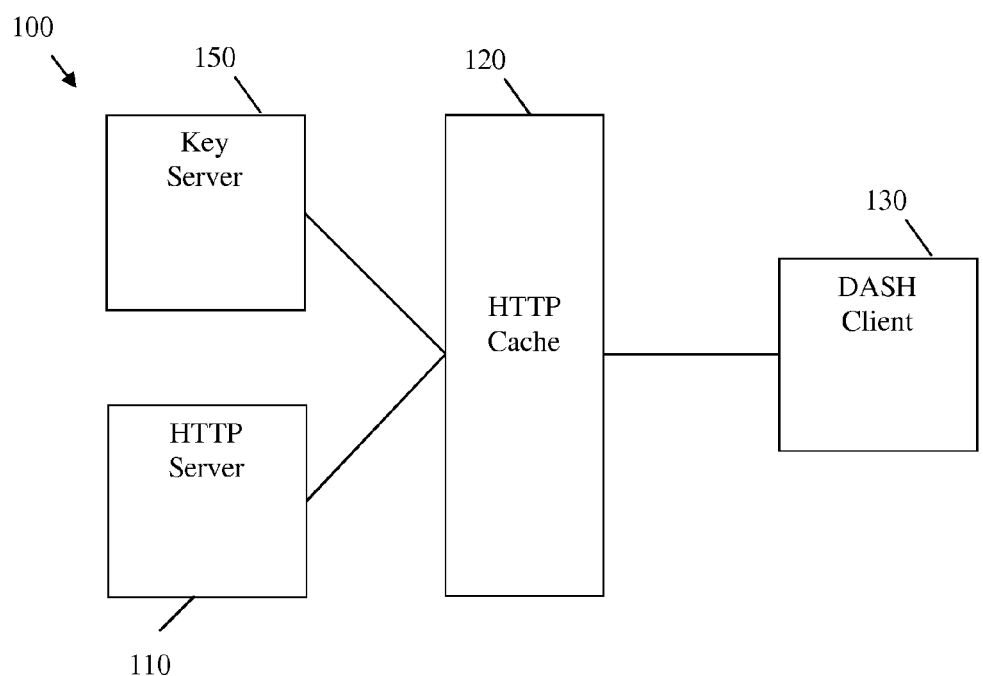
FIG. 1 is a schematic diagram of an embodiment of a DASH-enabled network architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a mechanism for the transmission of content protection information for media content such as video data and/or audio data. The content protection information may be encryption information for the media content, a signature associated with the media content, and/or a license associated with the media content. In an embodiment, the content protection information is transmitted in a metadata track rather than in a media content track. Placement of the content protection information in the metadata track may allow the content protection information to be processed independently of the associated media content. Such independent processing may in turn allow a client device receiving the content protection information to avoid processing media content that the client device is not capable of processing. The media content and metadata track information may be indicated to a client device via an media presentation description (MPD) file. The client device may determine the locations and associations of the media content and metadata track based on the MPD file.

The disclosed mechanisms may be implemented by components, such as server components or client components, that follow Dynamic Adaptive Streaming over Hypertext Transfer Protocol (DASH) protocols. In an embodiment, a DASH server may generate content protection information that contains one or more keys for media content. The DASH server may associate the content protection information with at least one segment of media content and generate a MPD specifying the association between the content protection information and the segment of media content. One segment of content protection information may be associated with one segment of media content or with multiple segments of media content. In contrast, one segment of media content may not be associated with more than one segment of content protection information. The DASH server may transmit the content protection information to a client independently of transmitting the media content and may also transmit the MPD to the client. In an embodiment, the DASH server may transmit the content protection information in a DASH metadata track. The MPD may also contain information regarding the availability and location of the key(s).

Transmitting content protection information in a metadata representation in this manner may be particularly useful in situations where rotating keys are used, since the content protection information may change frequently in such a situation. If the content protection information is placed in a media track, as in an in-band carriage case, a client may attempt to decrypt and read multiple segments of data that the client is not capable of reading or is not authorized to read. Transmissions of data that the client cannot process may waste bandwidth. In the present embodiments, on the other hand, a client may receive content protection information in the metadata track independently of receiving the associated media content. The client may then determine from the content protection information whether the associated media content can be processed. If the client determines that the media content cannot be processed, the client may make no attempt to process the media content, thus potentially saving bandwidth and processing power.

FIG. 1 is a schematic diagram of an embodiment of an architecture for a DASH-enabled network 100. The network 100 may comprise an Hypertext Transfer Protocol (HTTP) server 110, a key server 150, an HTTP cache 120, and a DASH client 130. The DASH client 130 may request media content from the HTTP server 110 via the HTTP cache 120. The HTTP server 110 may respond by transmitting an MPD file to the DASH client 130. Based on the information in the MPD file, the DASH client 130 may request segments from the HTTP server 110 and associated keys and/or initialization vectors (IVs) from the key server 150. Upon receiving the required components, the DASH client 130 may decrypt the segments, arrange the media content contained in the segments according to the MPD, and present the media content to the user. Requests and responses may pass through the HTTP cache 120, which may store associated data for faster access by the DASH client 130.

The HTTP server 110 may be any device configured to service HTTP requests from the DASH client 130. The key server 150 may be any device configured to service key and/or IV requests from the DASH client 130. The HTTP server 110 and the key server 150 may be located on the same device or on different devices or may be spread among a cluster of devices. For example, the HTTP server 110 and/or the key server 150 may comprise dedicated servers positioned in a data center. As another example, the HTTP server 110 and/or the key server 150 may operate as virtual machines (VMs) in a cloud computing environment. The HTTP server 110 may also be part of a content provider network or may be a node in a Content Data Network (CDN). The HTTP server 110 may populate the MPD file with information indicting uniform resource locators (URLs) and/or a URL scheme, which may allow the DASH client 130 to locate segment data. The HTTP server 110 may further populate the MPD file with information indicting URLs and/or a URL scheme, which may allow the DASH client 130 to locate the associated keys and/or IVs at the key server 150. The HTTP server 110 may further populate the MPD file with any information the DASH client 130 may require to present the data, such as period information, timing, segment format information, multiplexing information, etc. The HTTP server 110 may then transmit the MPD file to the DASH client 130 upon request. The HTTP server 110 may also transmit segments and/or message authentication codes (MACs) to the DASH client 130 upon request.

The HTTP cache 120 may be any device configured to temporarily store information for rapid access by the DASH client 130. For example, the HTTP cache 120 may be a browser cache, which may be a software based cache stored on the DASH client 130, a proxy cache, which may be a shared cache on the DASH client's network, a gateway cache, which may be a shared cache installed in the same network as the key server 150 and/or the HTTP server 110, or combinations thereof. The HTTP cache 120 may store segment data, MPD files, keys, IVs, MACs, ciphers, and/or any other data the DASH client 130 may require to present the media content. Upon receiving a request from the DASH client 130, the cache 120 may determine if the requested data is already stored in the HTTP cache 120. If the data is stored, the HTTP cache 120 may respond to the request from the DASH client 130 without forwarding the request to servers 110 and/or 150. If the requested data is not stored in the HTTP cache 120, the HTTP cache 120 may forward the request to the appropriate server, receive an associated response, forward the response to the requesting DASH client 130, and/or save any data from the response for later use by the same or a different DASH client 130.

The DASH client 130 may be a device configured to obtain media content via a DASH protocol and present such media content to a user, such as a mobile phone, personal computer (PC), Internet Protocol (IP) television (TV), IP TV set top box, laptop PC, internet radio device, tablet PC, media storage device, etc. The DASH client 130 may directly present the media content (e.g., visual data via a screen, audio data via a speaker, etc.) and/or may save and/or transmit the media content to one or more other devices for presentation. The DASH client 130 may request an MPD file, for example via an HTTP GET request. The DASH client 130 may then review the MPD file to determine URLs for keys, IVs, MACs, ciphers, segments, etc. The DASH client 130 may also obtain any keys, IVs, MACs, ciphers, segments, etc., needed to display the media content, for example via an HTTP GET request to the key server 150 and/or the HTTP server 110. Upon receiving the necessary information, the DASH client 130 may decrypt the segments with the ciphers, keys, and/or IVs, authenticate the segments with the MAC, select and/or multiplex the segment data as directed by the MPD, and present the media content to the user and/or transmit the media content to another device for storage and/or presentation to the user. It should be noted that while only one DASH client 130 is shown for purposes of clarity, there may be many DASH clients 130 that may request the same and/or different media presentations from the HTTP server 110 at any specified time.

Figure 2:
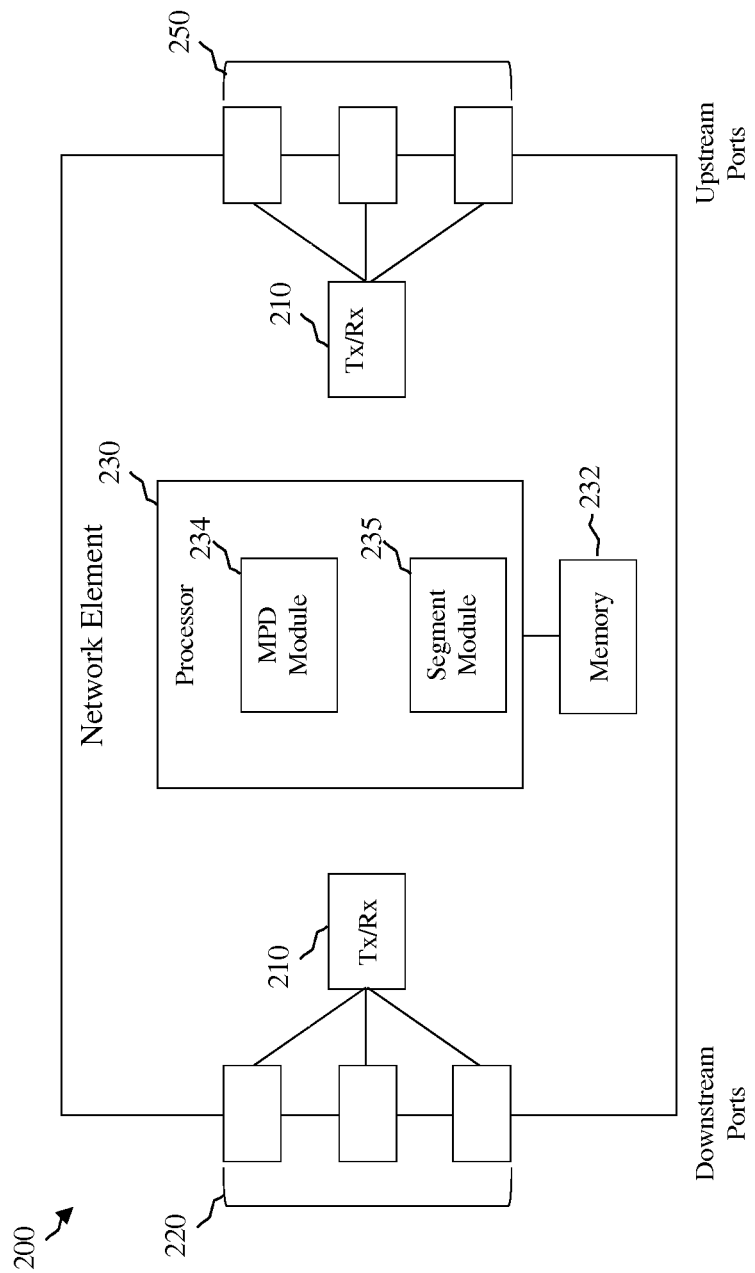
FIG. 2 is a schematic diagram of an embodiment of a network element that may act as a DASH device.
Figure 3:
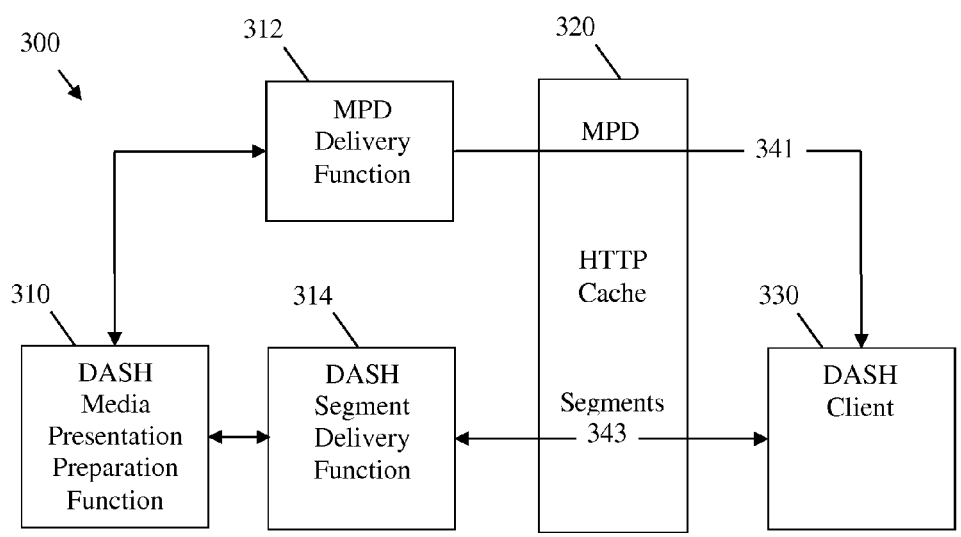
FIG. 3 is a schematic diagram of an embodiment of a DASH delivery process model.

FIG. 2 is a schematic diagram of an embodiment of a network element (NE) 200 that may act as a DASH device, such as the HTTP server 110, the key server 150, the DASH media presentation preparation function 310 of FIG. 3, the MPD delivery function 312 of FIG. 3, and/or the DASH segment delivery function 314 of FIG. 3, within a network and/or model such as the network 100 and/or the model 300 of FIG. 3 The NE 200 may be configured to generate MPDs and/or transmit segments to a DASH client such as the DASH client 130 and/or 330 of FIG. 3. The NE 200 may also act as a DASH client, such as the DASH client 130 and/or 330 of FIG. 3. The NE 200 may be implemented in a single node, or the functionality of the NE 200 may be implemented in a plurality of nodes, for example in a CDN or other content-based network. In some embodiments, the NE 200 may also act as another node in the network 100 and/or the model 300 of FIG. 3. One skilled in the art will recognize that the term NE encompasses a broad range of devices of which the NE 200 is merely an example. The NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as the NE 200. For instance, the features/methods in the disclosure may be implemented using hardware, firmware, and/or software installed to run on hardware. The NE 200 may be any device that transports frames through a network, e.g., a switch, router, bridge, server, client, etc. As shown in FIG. 2, the NE 200 may comprise transceivers (Tx/Rx) 210, which may be transmitters, receivers, or combinations thereof. A Tx/Rx 210 may be coupled to a plurality of downstream ports 220 (e.g., downstream interfaces) for transmitting and/or receiving frames from other nodes. A Tx/Rx 210 may also be coupled to a plurality of upstream ports 250 (e.g., upstream interfaces) for transmitting and/or receiving frames from other nodes. A processor 230 may be coupled to the Tx/Rxs 210 to process the frames and/or determine which nodes to send frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 may comprise an MPD module 234 and/or a segment module 235. The MPD module 234 may prepare an MPD and/or forward the MPD toward a client upon request. The segment module 235 may forward segments toward the client upon request. In an embodiment, the MPD module 234 may request an MPD file from a server and the segment module 235 may request media content and/or content protection information from a sever based on the MPD. In an alternative embodiment, the MPD module 234 and/or the segment module 235 may be implemented as instructions stored in the memory 232, which may be executed by the processor 230. In another alternative embodiment, the MPD module 234 and the segment module 235 may be implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, MPD module 234, segment module 235, downstream ports 220, Tx/Rxs 210, memory 232, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

FIG. 3 is a schematic diagram of an embodiment of a DASH delivery process model 300. The model 300 may comprise a DASH media presentation preparation function 310, which may be implemented on an HTTP server such as the HTTP server 110, a content provider server, etc. The model 300 may further comprise an MPD delivery function 312 and a DASH segment delivery function 314, which may be implemented on an HTTP server such as the HTTP server 110. The model 300 may further comprise an HTTP cache 320 and a DASH client 330, which may be substantially similar to the HTTP cache 120 and the DASH client 130, respectively. The DASH media presentation preparation function 310, the MPD delivery function 312, and the DASH segment delivery function 314 may operate to transmit an MPD 341 and associated segments 343 to the DASH client 330 via the HTTP cache 320.

The DASH media presentation preparation function 310 may be configured to prepare a media presentation for viewing by the DASH client 330. For example, the DASH media presentation preparation function 310 may receive data regarding media content from a CDN and may prepare an MPD to describe the media content. The MPD may list URLs for keys, IVs, ciphers, segments, and/or MACs. The MPD may list such URLs as static addresses and/or as functions that may be used to determine associated URLs. The MPD may be created using Extensible Markup Language (XML). The MPD may comprise information for one or more periods. Each period may comprise one or more adaptation sets. Each adaptation set may comprise one or more representations. Each representation may comprise one or more segments. A period may comprise timing data and may represent a content period during which a consistent set of encoded versions of the media content is available (e.g., a set of available bit rates, languages, captions, subtitles etc., that do not change). An adaptation set may represent a set of interchangeable encoded versions of one or several media content components. For example, a first adaptation set may comprise a main video component, a second adaptation set may comprise a main audio component, a third adaptation set may comprise captions, etc. An adaptation set may also comprise multiplexed content, such as combined video and audio. A representation may describe a deliverable encoded version of one or more media content components, such as an International Organization for Standardization (ISO) Base Media File Format (ISO-BMFF) version, an Moving Picture Experts Group (MPEG) version two transport system (MPEG-2 TS) version, etc. A representation may describe, for example, any codecs, encryption, and/or other data for presenting the media content. The DASH client 330 may dynamically switch between representations based on network conditions, device capability, user choice, etc. Such dynamic switching may be referred to as adaptive streaming. Each segment may comprise the media content data, may be associated with a URL, and may be retrieved by the DASH client 330, e.g., with an HTTP GET request. Each segment may contain a pre-defined byte size (e.g., 1000 bytes) and/or an interval of playback time (e.g., two or five seconds) of the media content. A segment may comprise the minimal individually addressable unit of data that can be downloaded using URLs advertised via the MPD. The periods, adaptation sets, representations, and/or segments may be described in terms of attributes and elements, which may be modified to affect the presentation of the media content by the DASH client 330. Upon preparing the MPD, the DASH media presentation preparation function 310 may deliver the MPD to the MPD delivery function 312.

The DASH client 330 may request that the MPD 341 be delivered by the MPD delivery function 312. The MPD delivery function 312 may respond with the MPD 341 via the HTTP cache 320. Based on the address data in the MPD, the DASH client 330 may request appropriate segments 343 from the DASH segment delivery function 314. It should be noted that segments 343 may be retrieved from a plurality of DASH segment delivery functions 314 and/or from a plurality of URLs and/or physical locations. The DASH client 330 may present the retrieved segments 343 to a user based on the instructions in the MPD 341.

As discussed above, media content providers or distributors may deliver various media content to subscribers or users using different devices, such as televisions, notebook computers, and mobile handsets. The media content provider may need to support different content protection schemes, such as different digital rights management (DRM) systems, in addition to a plurality of media encoders and/or decoders (codecs), media players, video frame rates, spatial resolutions, bit rates, video formats, or combinations thereof, as a result of varying capabilities and configurations of the end-user devices.

Content may be delivered in the form of streaming over a networking protocol such as HTTP. The content may be described in a manifest format, called a MPD, and may be packaged as media segments. The media segment packages may be in a format such as ISO-BMFF and MPEG Transport Stream under the family of standards MPEG-2, as described in ISO/International Electrotechnical Commission (IEC) 13818-1, entitled "Information Technology—Generic Coding of Moving Pictures and Associated Audio Information: Systems," which is incorporated herein by reference as if reproduced in its entirety A segment may be the minimal individually addressable unit of data and may be an entity that may be downloaded using a URL advertised via the MPD. One example of a media segment may be a four-second part of a live broadcast, which starts at playout time 0:42:38, ends at 0:42:42, and is available within a three-minute time window. Another example may be a complete on-demand movie, which may be available for the whole period for which the movie is granted rights.

Segments may be grouped into representations. A representation may be viewed as a single encoded version of a complete content asset. An example representation may be a sequence of ISO-BMFF segments, each containing a group of un-multiplexed 2.5 megabits per second (Mbps) 720 progressive (720p) Advanced Video Coding (AVC) video samples. Other example representations may be those for 96 kilobits per second (Kbps) MPEG-4 (ISO/IEC 14496) Advanced Audio Coding (AAC) audio streams in different languages. Conversely, a single transport stream containing video, audio and subtitles may be a single multiplexed representation. Moreover, a combined structure may also be possible wherein video and English audio may be a single multiplexed representation, while Spanish and Chinese audio tracks may be separate un-multiplexed representations.

The MPD may be an XML document, which may advertise available media segments and representations and may provide information enabling a streaming client to select a representation or set of representations, make adaptation decisions, and retrieve segments from the network. The MPD may be completely independent of the media segments themselves and may only signal the properties needed to determine whether a representation may be successfully played, as well as the functional properties of the representation, such as whether segments start at random access points.

The MPD may employ a hierarchical data model to describe groups of representations, presentations themselves, and their respective segments. At the representation level, the MPD may signal information such as bandwidth and codecs employed for successful presentation, as well as mechanisms for constructing URLs for accessing segments. The MPD may further provide additional information, such as trick mode and random access information, layer and view information for scalable and multi-view codecs, generic schemes that should be supported by a client wishing to play a given representation, etc.

Different representations of the same content asset, or the same content component in the un-multiplexed case, may be grouped into adaptation sets. All representations within an adaptation set may render the same content, and a client may switch between the representations on an as-needed basis. An example of an adaptation set may be a collection of 10 representations with video encoded in varying bit rates and resolutions. A client may switch between the adaptation sets at a segment granularity, while presenting the same content to the viewer. Under some segment-level restrictions and time alignments, a seamless representation switch may also be possible.

A period may be a time-limited subset of the presentation. Adaptation sets may be valid only within the period, and there may be no guarantee that adaptation sets in different periods will contain similar representations in terms of codecs, bit rates, etc. The MPD may contain a single period for the entire duration of the asset. Periods may be employed for advertisement markup, wherein separate periods may be dedicated to parts of the asset itself and to each advertisement.

For convenience, syntactic parts of an MPD document may be provided at a time after the MPD document is created. For example, XML Linking Language (XLink) may be used to specify which parts of the MPD, for example periods, may be determined in real time from a remote location. A use case for XLink-based MPD specification may be advertisement insertion, where precise timing of advertisement breaks may be known ahead of time and advertisement servers may determine in real time the exact advertisements that are inserted in such advertisement periods.

One aspect of content streaming may be content protection and rights management. Since there are different content protection and rights management schemes and systems, for example DRM systems, an open and standard content streaming solution may be agnostic to these schemes and systems and be configured to signal one or more schemes and carry scheme properties within the MPD.

Dynamic Adaptive Streaming over HTTP (MPEG-DASH), is disclosed in ISO/IEC document 23009-1:2012, entitled "Information technology-Dynamic adaptive streaming over HTTP (DASH)—Part 1: Media presentation description and segment formats", which is incorporated herein by reference as if reproduced in its entirety. Additional elements of DASH may be disclosed in ISO/IEC document 23009-1: 201xPDAM2 and ISO/IEC SoCD 23001-10, which are also incorporated by reference. In the DASH standards, one or more content protection and rights management schemes may be signaled using a ContentProtection descriptor, wherein the descriptor carries an opaque value. To signal a DRM scheme, a unique identifier may be given for the scheme, and the meaning of the opaque value may be defined, both of which may be specific to the DRM scheme and not defined in the DASH specification. An alternative may be to use a scheme-specific namespace instead of the opaque value.

The MPEG-DASH standard enables high quality streaming of media content over the Internet from conventional web servers. MPEG-DASH may divide content into a sequence of small file segments, with each file segment containing some interval of playback. Content over the same time period may be provided in a plurality of bit rates, and a MPEG-DASH client may automatically select the segment with the highest possible bit rate that can be played without causing stalls or re-buffering of the playback. As a result, the MPEG-DASH client may seamlessly adapt to variations in network conditions and provide high quality playback without stalls or re-buffering.

A media content provider may make media content available to clients by employing a DASH protocol. When employing DASH, a media content provider may, upon request, transmit an MPD file to the client. The MPD file may describe the media content as segments and may describe how such segments may be utilized to present the media content to a user. For example, the MPD file may describe segment timing, segment multiplexing (e.g., interrelation between audio segment and video segment timings), and/or URL information indicating where such segments may be obtained.

DASH may also support various forms of content protection. For example, segments may be encrypted, and the MPD may comprise information which may be used by the client to decrypt and/or authenticate each segment prior to presentation to the user. DASH content protection is described further in ISO/IEC document 23009-4:2013(E) entitled "Information technology-Dynamic adaptive streaming over HTTP (DASH)—Part 4: Segment encryption and authentication," which is incorporated herein by reference as if reproduced in its entirety. To perform decryption of media content, a client may require a key and/or an IV. A key and/or IV may be available for download by the client when the associated segment is available for download.

Figure 4:
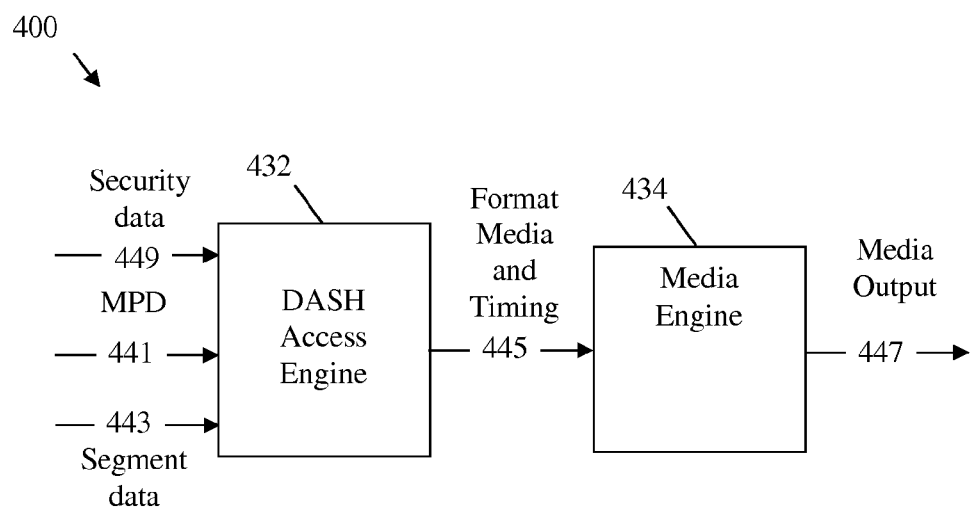
FIG. 4 is a schematic diagram of an embodiment of a DASH client process model.

FIG. 4 is a schematic diagram of an embodiment of a DASH client process model 400. The model 400 may comprise a DASH access engine 432 and a media engine 434, which may be implemented in a DASH client, such as DASH clients 130 and/or 330. The DASH access engine 432 may be any component configured to interpret an MPD, request media data, and receive such data. For example, the DASH access engine 432 may request an MPD 441, such as the MPD 341, from an MPD delivery function, such as the MPD delivery function 312. Based on the MPD 441, the DASH access engine 432 may also request segment data 443 from a DASH segment delivery function, such as the DASH segment delivery function 314. Also based on the MPD 441, the DASH access engine 432 may request any security data 449, such as MACs, from an HTTP server, to authenticate the segment data 443 and/or ciphers, IVs, and/or keys from a key server, such as the key server 150, to decrypt the segment data 443. Once the segment data 443 has been decrypted and authenticated, the DASH access engine 432 may forward the format, media, and timing 445 to the media engine 434. The media engine 434 may be any component configured to receive the format, media, and timing 445 and prepare media output 447 based on the format, media, and/or timing 445. The media output 447 may be stored and/or transmitted to a component for presentation to a user (e.g., a screen, speaker, etc.)

For content encryption, MPEG has developed two frameworks: Common Encryption for ISO-BMFF (ISO/IEC 23001-7) and DASH Segment Encryption and Authentication (ISO/IEC 23009-4), both of which are incorporated herein by reference. Common Encryption (CENC) standardizes which parts of an ISO-BMFF file may be encrypted using the standard Advanced Encryption Standard (AES) Counter Mode (AES-CTR) or Cipherblock Chaining (AES-CBC) modes and how encryption metadata is signaled within a track. CENC may be a content protection system that is responsible for delivering encryption/decryption keys to a client, given the encryption metadata in the file. The CENC framework is extensible and may use other encryption algorithms beyond these two, if defined. CENC may be used with several commercial DRM systems, such as Microsoft® PlayReady. A draft of the second edition of CENC (CD of 23001-7, $2^{nd}$ Edition), which is incorporated herein by reference, may also provide a mechanism to signal the CENC scheme and carry encryption key identifiers within a DASH ContentProtection descriptor. Specifically, the CENC scheme may be signaled by the content protection scheme identifier mp4protection for ISO Media files, and the identifiers of keys used to encrypt content segments associated with the ContentProtection descriptor may be provided using an attribute, default Key Identifier (default_KID), whose value may be a space-delimited list of different default_KID values.

DASH Segment Encryption (DASH-SEA) may be agnostic to the segment format, so encryption metadata may also be carried within the MPD ContentProtection descriptor. For example, the descriptor may contain information on which key is used for the decryption of a given segment and how to obtain the key. The baseline DASH-SEA scheme may be equivalent to the one defined in HTTP Live Streaming (HLS), with AES-CBC encryption and key transport using HTTP or Hypertext Transfer Protocol Secure (HTTPS). The standard itself may be extensible in terms of supporting other encryption algorithms and DRM systems, similarly to CENC.

There may be a shortcoming with the two foregoing schemes in supporting key switching when segment adaptation occurs, especially when segment encryption involves key rotation, for example when different ranges of segments in different representations employ different keys. Such a shortcoming may largely be due to the ContentProtection element that, much like its generic type, DescriptorType, may be associated with segments at different levels in the hierarchical data model of the MPD, such as Period, AdaptationSet and Representation, but may not be associated with segments at the Segment level. In the CENC case, all the key identifiers may be obtained for each of the representations that a client may potentially switch to, which may result in information over-fetching. Such over-fetching may not be desirable in the scenario of frequent key rotation. In the DASH-SEA case, when a representation involves key rotation, the key rotation information may be provided within the CryptoPeriod element within the ContentProtection descriptor. When a client receives segments from different representations, the client may have difficulty in determining, across different CryptoPeriods for different representations, which key to switch to.

Therefore, a need may exist for efficient signaling of key information used for decrypting streaming segments to streaming clients in dynamic adaptive streaming systems. The present disclosure may provide a mechanism for signaling time-variant key information as representations of key segments to a streaming client when actual key information could be carried in key segments in a key format.

In the present disclosure, the concept of media segments may be extended to a concept of key segments. Further the concept of media representations may be extended to a concept of key representations. In a key representation, as compared to a media representation, each segment may contain information of a single key that may be used for decrypting an associated media segment or segments or any other media segment or segments. In one embodiment of a mechanism for associating a key segment with one or more media segments, a key segment may span over one or more media segments that it is associated with. Furthermore, in cases where some media segments are not encrypted, a key representation may have a sequence of key segments that are not necessarily continuous in time.

Figure 5:
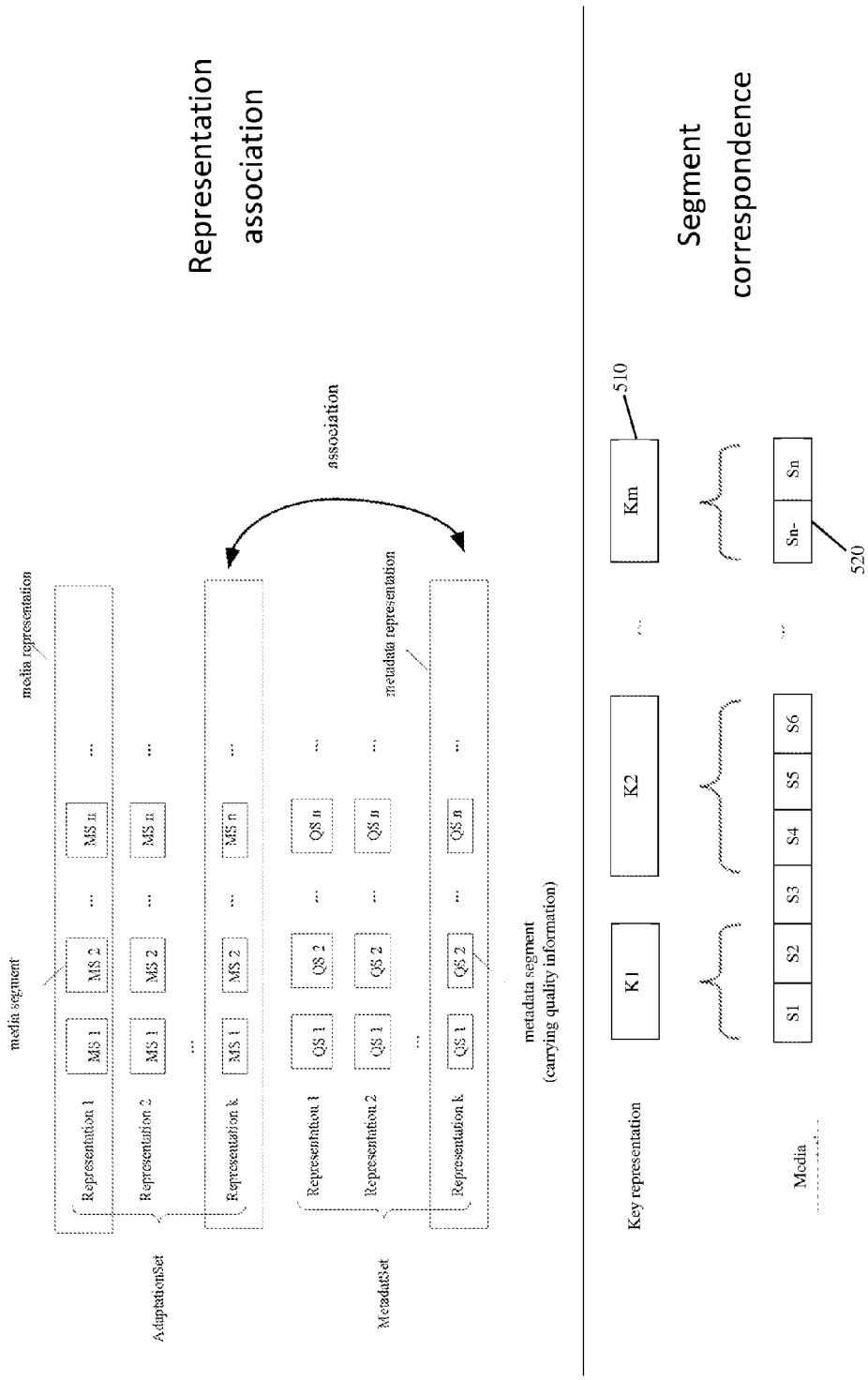
FIG. 5 is a schematic diagram of associations between key segments and media segments.

FIG. 5 is a schematic diagram of associations between key segments and media segments. Such associations may be described in the presentation time of media segments, for example, 1~6, 10~18, . . . , m+6−1 seconds if each media segment 520 is three seconds long, or in a range of media segment numbers, for example segments 1~2, 4~6, . . . , Sn−1~Sn. Depending on the kind of association, a length of a key segment 510 may be defined using a unit of the length and a value of the length. One example may be that a unit may be a presentation time and a value may be a period of the presentation time. Another example may be that a unit may be a segment range and a value may be a pair of segment numbers $S_i$ and $S_j$ defined as the range from segment $S_i$ to segment $S_j$.

As an example, if all segments 520 are three seconds long in a video representation of content that is 30 minutes long and the content encrypted with one key, then the key representation may contain only one key segment 510 of a key and length 30 minutes. However, if each video segment is encrypted with a different key, then each key segment 510 may have a key and length of three seconds, and the key representation may have as many segments as the video representation. As one of ordinary skill in the art may see, there may be numerous combinations and possibilities that may exist between the two extremes of this example, and this disclosure is meant to encompass those additional combinations and possibilities.

At the representation level, a signaling mechanism may be employed to indicate that one media representation may be associated with at most one key representation, whereas one key representation may be associated with one or more media representations in the cases in which many representations share the same key representation. One embodiment of a signaling mechanism may be to signal such an N-to-1 association relationship between media representations and key representations by leveraging an attribute of the DASH Representation known as dependencyId. dependencyId may be used in a media representation to indicate the identification of a key representation. When an MPD indicates that more than one media representation has dependence on the same key representation, these media representations may employ the corresponding key segments of the key representation to decrypt their respective segments.

Figure 6:
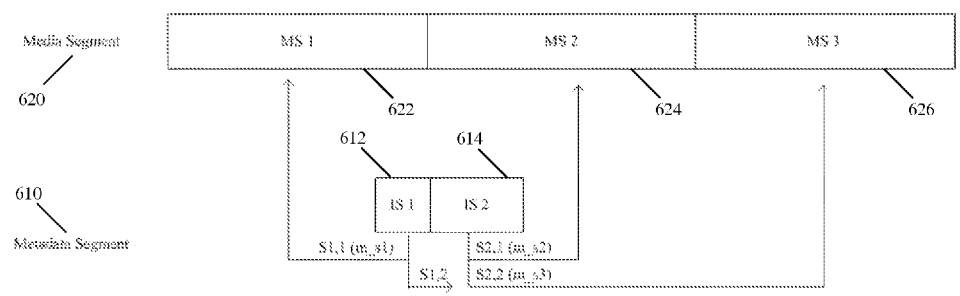
FIG. 6 is a schematic diagram of a metadata segment containing sub-segments.

FIG. 6 is a schematic diagram of a metadata segment 610 containing sub-segments. The metadata segment 610 is separate from a media segment 620. The media segment 620 contains three media sub-segments 622, 624, and 626. The metadata segment 610 contains two segment index boxes 612 and 614, which document the three media sub-segments 622, 624, and 626. The first segment index box 612 documents the first media sub-segment 622. The second segment index box 614 contains two sub-segments, the first of which documents the second media sub-segment 624, and the second of which documents the third media sub-segment 626.

With the notion and specification of key representations and key segments, as well as their association with media representations, key information may be collected, packaged and managed in similar manners for media counterparts. In addition, many features that may be specified for media representations and segments may be also specified in MPDs for key representations and key segments. Further, adaptive streaming clients may be able to operate in a consistent manner when processing key information for decrypting media content, much like the process of handling content segments. For example, a client may have a similar adaptation strategy and buffering model to fetch, switch, and buffer key segments, as well as handle the synchronization of key segments with other segments, similar to the process involving media segments. Another example may be to allow specification of key availability, when a key segment is available, in order to allow early retrieval of key segments.

Key segments may be specified in one or more formats. One format may use the World Wide Web Consortium (W3C) XML Encryption standard. Another format may be the Portable Symmetric Key Container (PSKC) specification as discussed in Internet Engineering Task Force (IETF) document Request For Comments (RFC) 6030, which is incorporated by reference. The PSKC specification may specify a standardized XML-based key container for transporting symmetric keys and key-related metadata. Yet another possibility may be to carry key information in a metadata track, called key track, of an ISO-BMFF file, wherein a key representation is assigned to represent one or more key tracks.

It should be noted that the present disclosure refers to the key information as an example of content protection and rights management information. As one of ordinary skill in the art should see, the same approach may be taken for signaling and carriage of rights management information, using a similar notion of rights segments and rights representations, and their association with media segments and representations.

As discussed hereinabove, this document proposes to treat time variant encryption and signature information (such as segment variant encryption and signing, key and initial vector information used in key rotation, etc.) as timed metadata of (encrypted and signed) media. There may be some advantages with this treatment as an alternative to in-band carriage in media tracks and segments. First, one can carry this kind of information in metadata tracks of ISO Base Media File Format and signal it in DASH, in the same manners as for other timed metadata such as media quality and power consumption information. Second, this may allow capturing of this kind of information in a separate file of its own, and delivering it separately from the encrypted and signed content, in order to enable different technical schemes (such as time-variant encryption and signing across segment groups) as well as different business models such as event ticketing, late-binding and super-distribution.

Further, associations between representations and/or metadata tracks and media tracks may be specified as follows:

| | |
|---|---|
| @associationId | ○ May specify all complementary Representations the Representation depends on in the decoding and/or presentation process as a whitespace-separated list of values of @id attributes. If not present, the Representation can be decoded and presented independently of any other Representation. This attribute may not be present where there are no dependencies. |
| @associationType | ○ May specify the kind of dependency for each complementary Representation the Representation depends on that has been signaled with the @dependencyId attribute. Values taken by this attribute may be the reference types registered for the track reference types at http://www.mp4ra.org/trackref.html. If not present, it may be assumed that the Representation depends on the complementary Representations for decoding and/or presentation process without more precise information. This attribute may not be present when @dependencyId is not present. |

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A Dynamic Adaptive Streaming over Hypertext Transport Protocol (DASH) server component comprising:
   a memory;
   a processor coupled to the memory and configured to:
      generate content protection information;
      generate media content comprising segments;
      associate the content protection information with at least one of the segments; and
      generate a media presentation description (MPD) comprising a metadata representation signaling the content protection information, a media content representation signaling the media content, and an association between the content protection information and the at least one of the segments; and
   a transmitter coupled to the processor and configured to transmit the MPD to a client.

2. The DASH server component of claim 1, wherein the processor is further configured to further generate the MPD in response to a hypertext transfer protocol (HTTP) GET request.

3. The DASH server component of claim 1, wherein the content protection information comprises at least one of encryption information, a signature, a license, and rights management information.

4. The DASH server component of claim 1, wherein a first segment of the content protection information is associated with the at least one of the segments.

5. The DASH server component of claim 1, wherein the content protection information comprises rotating keys that vary over time.

6. The DASH server component of claim 1, wherein the content protection information is part of a file format metadata track and the media content is part of a file format media content track, and wherein the metadata track and the media content track are associated with one another.

7. The DASH server component of claim 6, wherein a media segment in the media content track includes a first media sub-segment, a second media sub-segment, and a third media sub-segment, wherein the metadata track includes a first index box and a second index box, and wherein the first index box is associated with the first media sub-segment and the second index box is associated with the second media sub-segment and the third media sub-segment.

8. The DASH server component of claim 1, wherein the metadata representation is independent of the media content representation.

9. The DASH server component of claim 8, wherein independent means that the metadata representation is a first representation of the MPD and the media content representation is a second representation of the MPD.

10. The DASH server component of claim 8, wherein independent means that the metadata representation is out of band from the media content representation.

11. A method for transmitting content protection information for a Dynamic Adaptive Streaming over Hypertext Transport Protocol (DASH) transmission, the method comprising:
generating, by a DASH server component, content protection information;
generating, by the DASH server component, media content comprising segments;
associating the content protection information with at least one of the segments;
generating a media presentation description (MPD) comprising a metadata representation signaling the content protection information, a media content representation signaling the media content and an association between the content protection information and the at least one of the segments; and
transmitting the MPD to a client.

12. The method of claim 11, wherein the content protection information comprises a signature associated with the media content.

13. The method of claim 11, wherein a first segment of the content protection information is associated with the at least one of the segments.

14. The method of claim 11, wherein the content protection information comprises rotating keys that vary over time.

15. The method of claim 11, wherein the content protection information is part of a file format metadata track and the media content is part of a file format media content track, and wherein the metadata track and the media content track are associated with one another.

16. The method of claim 15, wherein a media segment in the media content track includes a first media sub-segment, a second media sub-segment, and a third media sub-segment, wherein the metadata track comprises a first index box and a second index box, and wherein the first index box is associated with the first media sub-segment and the second index box is associated with the second media sub-segment and the third media sub-segment.

17. The method of claim 15, wherein the metadata track is out of band from the media content track.

18. A Dynamic Adaptive Streaming over Hypertext Transport Protocol (DASH) client comprising:
a transmitter;
a receiver configured to receive a media presentation description (MPD) from a DASH server; and
a processor coupled to the transmitter and receiver and configured to:
extract content protection information from a metadata representation of the MPD;
extract media content from a media content re representation of the MPD;
extract from the MPD an association between the content protection information and the media content; and
determine whether to process the media content based on the content protection information.

19. The DASH client of claim 18, wherein the content protection information comprises a license associated with the media content.

20. The DASH client of claim 18, wherein the processor is further configured to extract from the MPD an indication of a location of the content protection information.

21. The DASH client of claim 18, wherein a first segment of the content protection information is associated with at least one segment of the media content, and wherein one segment of the media content is not associated with more than one segment of the content protection information.

22. The DASH client of claim 18, wherein the content protection information comprises protection information that varies over time.

23. The DASH client of claim 18, wherein the media content comprises a first media sub-segment, a second media sub-segment, and a third media sub-segment, wherein the content protection information comprises a first index box and a second index box, and wherein the first index box is associated with the first media sub-segment and the second index box is associated with the second media sub-segment and the third media sub-segment.

* * * * *